United States Patent [19]

Hirai

[11] Patent Number: 5,452,914
[45] Date of Patent: Sep. 26, 1995

[54] AIR BAG FOR A MOTOR VEHICLE

[75] Inventor: Kinji Hirai, Kanagawa, Japan

[73] Assignee: Takata Corporation, Tokyo, Japan

[21] Appl. No.: 264,149

[22] Filed: Jun. 22, 1994

[51] Int. Cl.⁶ .................................. B60R 21/20
[52] U.S. Cl. ............................... 280/743.1
[58] Field of Search ........................ 280/743 R

[56] References Cited

U.S. PATENT DOCUMENTS 5,141,787  8/1992  Yamamoto ................... 280/743 R

FOREIGN PATENT DOCUMENTS

0489320A1  10/1992  European Pat. Off. .
4-266544    9/1992  Japan .

Primary Examiner—Kenneth R. Rice
Attorney, Agent, or Firm—Kanesaka & Takeuchi

[57] ABSTRACT

An air bag 1 made from a thermoplastic elastomer film having an M value of 4.0 or more as defined by the formula:

$$M = (S/E) \times T \times 100$$

where S is the tearing strength (kg/cm) per unit width (1 cm) of the thermoplastic elastomer film, E is the elongation at rupture (%), and T is the tensile strength (kg).

8 Claims, 2 Drawing Sheets

AIR BAG FOR A MOTOR VEHICLE

FIELD OF THE INVENTION

The present invention relates to an air bag of an air-bag device installed into a motor vehicle to protect a person involved in an accidental collision, and particularly to an air bag made of a thermoplastic elastomer.

DESCRIPTION OF PRIOR ART

An air-bag device for a driver installed at a center of a steering wheel is formed of a retainer, an air bag which is attached to the retainer, a gas generator (inflator) to inflate the air bag, and a module cover which covers the air bag. When the motor vehicle collides, the inflator generates gas, and the air bag inflates into the cabin while breaking the module cover.

A conventional air bag for a driver is made of fabrics, and has a circular front panel and a circular rear panel having a center opening into which the inflator is inserted. The periphery of the front panel and the periphery of the rear panel are stitched up together.

Regarding an air-bag device for a passenger's seat, which is mounted in the instrument panel, the air bag and the inflator are installed in a container, and a module cover is placed in such a way as to cover the opening of the container. The module cover is also called the "cover door" or the "deployment door". Upon an accidental collision of a motor vehicle, the inflator is actuated to inflate the air bag, so that the inflating air bag pushes the module cover and opens up into the cabin, which results in the full inflation of the air bag into the cabin.

A conventional air bags for a passenger is also made of fabrics.

An air bag made from a thermoplastic elastomer such as thermoplastic urethane is disclosed in Japanese Patent Laid-open No. 4-266544 (applicant :BASF).

A fabric air bag has the disadvantages of requiring more processing steps and of extra cost for stitching the component fabrics.

On the other hand, an air bag made from a thermoplastic elastomer which is disclosed in Japanese Patent Laid-open No. 4-266544 is simple in terms of its fabrication owing to the use of fused joining instead of stitching. However, the elastomer air bag has the problem that it bursts while being inflated. To prevent bursting, the membrane of the elastomer air bag needs to be thickened to approximately 500 μm or reinforced with a fiber layer.

The thickening or reinforcing of the membrane with a fiber layer increases the materials cost, the weight, and the bulk volume in the folded state. These disadvantages hinder the use for the air bag.

OBJECT AND SUMMARY OF THE INVENTION

The object of this invention is to solve the problems of conventional air bags made from thermoplastic elastomer and to provide a resin air bag having excellent burst resistance.

The resin air bag of this invention is made from a thermoplastic elastomer film having an M value of 4.0 or more. The M value is defined by formula given below:

$$M=(S/E) \times T \times 100$$

where S is the tearing strength (kg/cm) of the thermoplastic elastomer film per unit width (1 cm) thereof, E is the breaking elongation (%), and T is the tensile strength (kg). In concrete terms, the M value of the thermoplastic elastomer film of this invention can be expressed as:

$$M=(S/E) \times T \times 100 \geq 4.0.$$

When the M value, which is derived from the formula, $M=(S/E) \times T \times 100$, where S is the tensile strength (kg/cm) of the thermoplastic elastomer film per unit width (1 cm) thereof, E is the breaking elongation (%), and T is the tensile strength (kg), is 4.0 or more, the balance between the strength (S) and the breaking elongation (E) is kept at a good balance. In addition, the tearing strength (T) is also taken into consideration, so the air bag having the M value at or higher than 4.0 offers significant burst resistance. A preferred M-value range may be 50.

Preferably, the air bag is for the driver and has a circular front panel and a circular rear panel having a central opening for the insertion of an inflator, and is structured with the fused peripheries of the front panel and the rear panel. Since this type of air bag for the driver is fabricated by fusion for joining, the production process is easily completed.

The M-value of the rear panel is preferably equal to or higher than the M value of the front panel.

For the air bag for the driver, since the M value of the rear panel is equal to or higher than that of the front panel, the burst resistance is increased with the use of less material. Accordingly, to prevent the bursting of the air bag of the driver, an increase in the strength of the front panel side is considered. In this respect, the inventors have studied and found that, during the inflation of the air bag, the load onto the rear panel is higher than the load onto the front panel and that the air bag is more surely prevented from bursting by increasing the M-value on the rear panel side.

It is preferable that a coating layer or a heat-resistant film which has a higher heat resistance than that of the thermoplastic elastomer film is placed at the inner surface of the periphery of the opening of the rear panel.

The inner surface of the periphery of the opening of the rear panel is likely to be damaged by heat from a high-temperature gas ejected from the inflator during the inflation of the air bag. A highly heat-resistant coating layer or a heat-resistant film effectively protects the inner surface.

According to this invention, it is most favorable to employ thermoplastic polyurethane (hereinafter referred to simply as "TPU") as the thermoplastic elastomer, silicone resin as the highly heat-resistant coating layer, and polyimide resin as the heat-resistant film.

DETAILED DESCRIPTION OF PREFERRED EMBODIMENT

Figure 1:
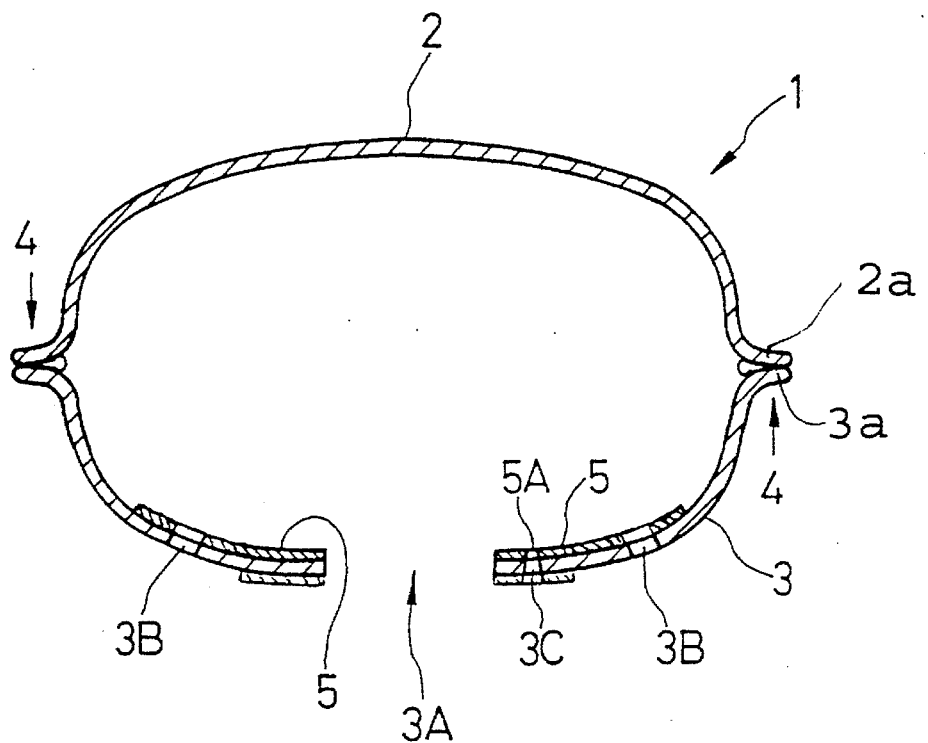
FIG. 1 is a cross-sectional view of an embodiment of an air bag of the invention for a driver of a motor vehicle.

The present invention will be described in more detail with reference to an embodiment shown in the drawings.

Figure 2:
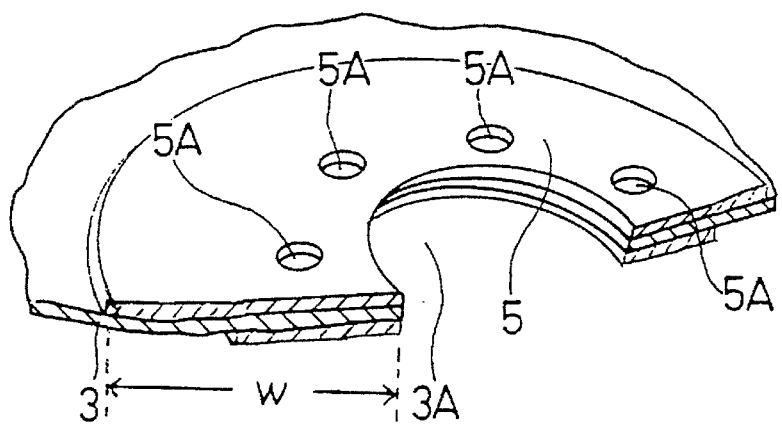
FIG. 2 is a partially enlarged perspective view of the air bag shown in FIG. 1.

An air bag 1 shown in FIGS. 1 and 2 is made from TPU and has a circular front panel 2 and a circular rear panel 3 having a central opening 3A for inserting an inflator (not shown). The periphery 2a of the front panel 2 and the periphery 3a of the rear panel 3 are fused together (the reference number 4 designates the fused part). On the inner surface of the periphery of opening 3A of the rear panel 3, a film 5 made from polyimide resin which has higher heat resistance than TPU is fused to the rear panel 3. The method used for fusing may be heat fusing, impulse sealing, or high-frequency sealing.

A reference numeral 3B shows a vent hole. Numerals 5A and 3C show bolt holes povided at the film 5 and the rear panel 3, respectively, for attaching the air bag to a retainer (not shown).

In the present invention, a thermoplastic elastomer structuring the air bag has the M value at 4.0 or more, where M is defined as M=(S/E)×T×100 wherein S (kg/cm) is tensile strength per unit width (1 cm) thereof of the theromoplastic elastomer film, E is the elongation at rupture (%) of the film, and T is the tearing strength (kg) of the film. This type of elastomer is obtained through an appropriate selection of the thickness corresponding to the degree of elongation of each type of elastomer.

An increased M value improves the burst resistance of the film. However, an excessively high M value may add unnecessary cost. Although the required M value differs depending on the performance of each inflator and on the shape and size of the bag, generally a preferred range of the M value is from 6.0 to 40.0.

As for the air bag shown in FIGS. 1 and 2, it is preferred that the M value of the rear panel is equal to or larger than that of the front panel from the stand point of burst resistance. In normal cases, the M value is preferably in a range from 11.0 to 40.0 for the rear panel, and from 5.0 to 20.0 for the front panel, and preferably the M value for the rear panel is larger than that of the front panel by 1.5 to 4 times, more preferably by 1.5 to 3 fold, and most preferably by approximately 2 times.

The thermoplastic elastomer of this invention may be one which satisfies the above-specified range of M values, and urethane, ester, olefin, polyfluorocarbon, styrene, 1,2-polybutadiene, amide, chlorinated polyethylene, polyvinylchloride may be used instead of the thermoplastic polyurethane described above.

A highly heat-resistant film which is attached to the inner surface of the periphery of the opening of the rear panel may be silicone resin, fluororesin such as PFA, polyphenylenesulfide resin, polyamideimide resin, aramid resin, polyparabanic acid resin, polysulfone resin, amorphous polyallylate resin, polyethersulfone resin, polyetherimide resin, polyethylenenaphthalate resin, polyetherketone resin, as well as polyimide resin. The optimum thickness and outside diameter of this type of film depends on the performance of the inflator applied and the physical properties of the film (particularly the melting point and the breaking strength). Usually, it is preferable to select the thickness to be in a range from 0.02 to 0.1 mm and to maintain the width W, as shown in FIG. 2, of 50 to 200 mm.

Figure 3:
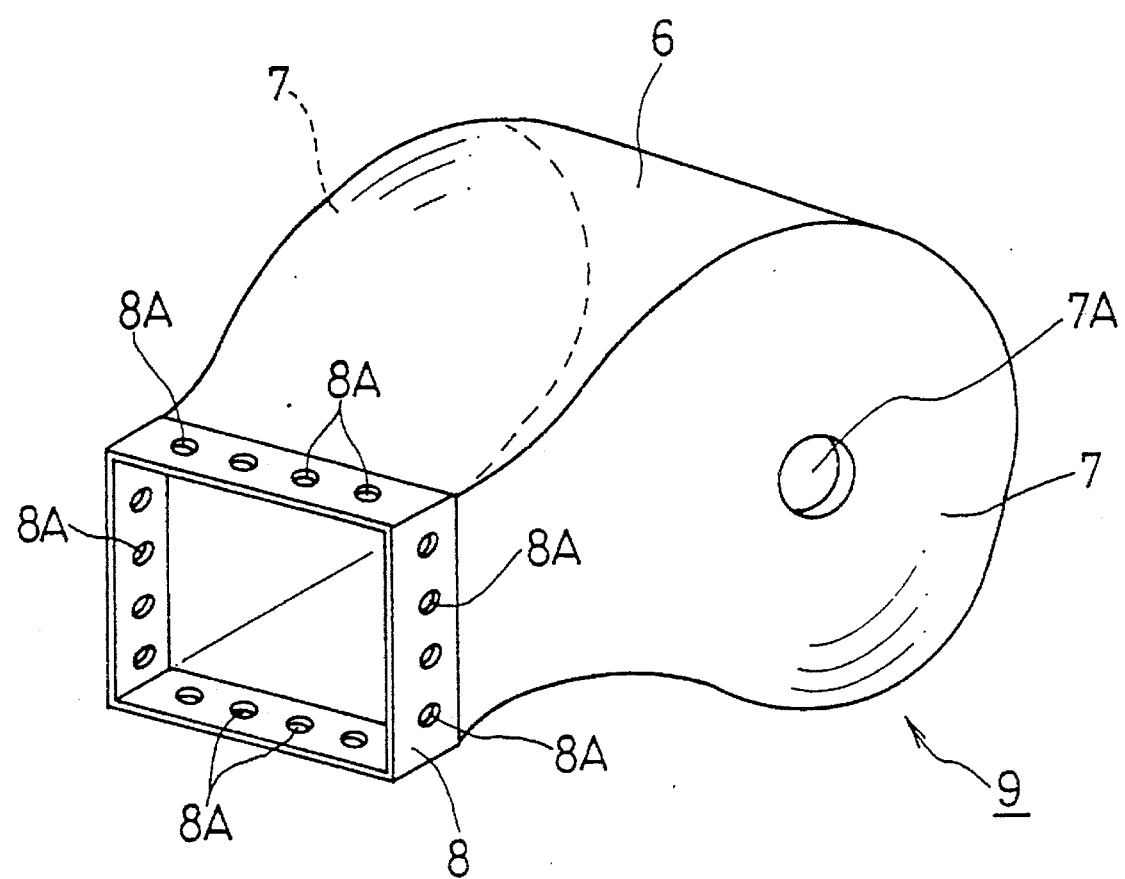
FIG. 3 is a perspective view showing an embodiment of an air bag of the invention for a passenger of a motor vehicle.

Not limited to the driver's seat, the resin air bag of this invention is, of course, also applicable as the air bag 9 for a passenger and comprises, as shown in FIG. 3, a center panel 6, side panel 7, and an attachment 8 to a container ( not shown ). A reference number 7A shows a vent hole, and 8A shows bolt holes for connecting to the container. Also the air bag 9 for a passenger's seat is easily manufactured by fusing the center panel 6 with the side panel 7.

In the following is a further detailed description of this invention with reference to examples.

Example 1

Several types of thermoplastic polyurethane shown in Table 1 were employed as the thermoplastic elastomer, and the M value in each case was adjusted by changing the thickness of the material, which is shown in Table 1 and Table 2. The polyimide resin film was used as the highly heat-resistant film with the thickness of 0.1 mm and the width of 200 mm to the inside of the bag, and the width of 50 mm at the outside of the bag. Then the thermal fusing was applied to the materials to form an air bag for a drive as seen in FIG. 1.

The obtained air bag Was tested for inflation. The result is given in Tables 1 and 2. The mark (x) indicates "broken", (o) indicates "not-broken", and (oo) indicates "not-broken with a margin".

Tables 1 and 2 clearly shows that an air bag of this invention having the M value of 4.0 or more surely prevents the breaking of the bag.

Also, from these tables it can be seen that an air bag having an M value of the front panel of 6.0 or more and having an M value of the rear panel of 12.0 or more offers a higher reliability.

TABLE 1

| | | Front panel | | | | | Rear panel | | | | | Test results | | |
|---|---|---|---|---|---|---|---|---|---|---|---|---|---|---|
| No. | Material | Thickness (mm) | Tensile strength (S) kg/cm (N/cm) | Breaking elongation (E) (%) | Tearing strength (T) kg (N) | M value | Thickness (mm) | Tensile strength S kg/cm (N/cm) | Breaking elongation (E) (%) | Tearing strength (T) kg (N) | M value | Front panel | Rear panel | Evaluation |
| 1 | A | 0.1 | 8.5 (83) | 420 | 1.46 (14.3) | 3.0 (283) | 0.1 | 8.5 (83) | 420 | 1.46 (14.3) | 3.0 (283) | x | x | Not acceptable |
| 2 | | | | | | | 0.2 | 13.9 (136) | 430 | 1.97 (19.3) | 6.4 (610) | x | o | Not acceptable |
| 3 | | 0.2 | 13.9 (136) | 430 | 1.97 (19.3) | 6.4 (610) | 0.2 | 13.9 (136) | 430 | 1.97 ((19.3) | 6.4 (610) | oo | o | Acceptable |

TABLE 1-continued

| | | Component material of the air bag | | | | | | | | | | | |
|---|---|---|---|---|---|---|---|---|---|---|---|---|---|
| | | Front panel | | | | Rear panel | | | | | Test results | | |
| No. | Material | Thickness (mm) | Tensile strength (S) kg/cm (N/cm) | Breaking elongation (E) (%) | Tearing strength (T) kg (N) | M value | Thickness (mm) | Tensile strength S kg/cm (N/cm) | Breaking elongation (E) (%) | Tearing strength (T) kg (N) | M value | Front panel | Rear panel | Evaluation |
| 4 | | | | | | | 0.3 | 18.2 (178) | 500 | 3.53 (34.6) | 12.8 (1232) | ○○ | ○○ | Good |
| 5 | | | | | | | 0.4 | 32.4 (318) | 490 | 4.56 (44.7) | 30.1 (2901) | ○○ | ○○ | Good |
| 6 | B | 0.1 | 7.4 (73) | 530 | 1.01 (9.9) | 1.4 (136) | 0.1 | 7.4 (73) | 530 | 1.01 (9.9) | 1.4 (136) | x | x | Not acceptable |
| 7 | | | | | | | 0.2 | 12.9 (127) | 550 | 1.76 (17.3) | 4.1 (399) | x | ○ | Not acceptable |
| 8 | | 0.2 | 12.9 (127) | 550 | 1.76 (17.3) | 4.1 (399) | 0.2 | 12.9 (127) | 550 | 1.76 (17.3) | 4.1 (399) | ○ | ○ | Acceptable |
| 9 | | | | | | | 0.3 | 18.5 (181) | 490 | 2.79 (27.4) | 10.5 (1012) | ○ | ○ | Acceptable |

Material:
A: Tafretan (ether system) NIPPON VALQUA INDUSTRIES, LTD.
B: Tafretan (lactone system) NIPPON VALQUA INDUSTRIES, LTD.
C: Silkron (ester system) OKURA INDUSTRIAL CO., LTD.
D: Pandex (adipate system) DAINIPPON INK & CHEMICALS, INC.
E: Tafretan (polycarbonate system) NIPPON VALQUA INDUSTRIES, LTD.

TABLE 2

| | | Component material of the air bag | | | | | | | | | | | |
|---|---|---|---|---|---|---|---|---|---|---|---|---|---|
| | | Front panel | | | | Rear panel | | | | | Test results | | |
| No. | Material | Thickness (mm) | Tensile strength (S) kg/cm (N/cm) | Breaking elongation (E) (%) | Tearing strength (T) kg (N) | M value | Thickness (mm) | Tensile strength S kg/cm (N/cm) | Breaking elongation (E) (%) | Tearing strength (T) kg (N) | M value | Front panel | Rear panel | Evaluation |
| 10 | C | 0.1 | 7.8 (76) | 545 | 1.27 (12.5) | 1.8 (174) | 0.1 | 7.8 (76) | 545 | 1.27 (12.5) | 1.8 (174) | x | x | Not acceptable |
| 11 | | | | | | | 0.2 | 15.5 (152) | 600 | 2.61 (25.6) | 6.7 (648) | x | ○ | Not acceptable |
| 12 | | 0.2 | 15.5 (152) | 600 | 2.61 (25.6) | 6.7 (648) | 0.2 | 15.5 (152) | 600 | 2.61 (25.6) | 6.7 (648) | ○○ | ○ | Acceptable |
| 13 | | | | | | | 0.3 | 21.4 (210) | 605 | 3.06 (30.0) | 10.8 (1041) | ○○ | ○ | Acceptable |
| 14 | D | 0.1 | 6.2 (61) | 480 | 1.18 (11.5) | 1.5 (146) | 0.1 | 6.2 (61) | 480 | 1.18 (11.5) | 1.5 (146) | x | x | Not acceptable |
| 15 | | | | | | | 0.2 | 14.0 (137) | 515 | 2.64 (25.9) | 7.2 (689) | x | ○ | Not acceptable |
| 16 | | 0.2 | 14.0 (137) | 515 | 2.64 (25.9) | 7.2 (689) | 0.2 | 14.0 (137) | 515 | 2.64 (25.9) | 7.2 (689) | ○○ | ○ | Acceptable |
| 17 | | | | | | | 0.3 | 19.0 (186) | 500 | 3.67 (36.0) | 13.9 (1339) | ○○ | ○○ | Good |
| 18 | E | 0.2 | 12.1 (119) | 360 | 240 (24.0) | 8.1 (793) | 0.2 | 12.1 (119) | 360 | 2.40 (24.0) | 8.1 (793) | ○○ | ○ | Acceptable |
| 19 | | | | | | | 0.3 | 17.2 (169) | 350 | 3.80 (37.0) | 18.7 (1787) | ○○ | ○○ | Good |

TABLE 2-continued

| | | Component material of the air bag | | | | | | | | | | | |
|---|---|---|---|---|---|---|---|---|---|---|---|---|---|
| | | Front panel | | | | | Rear panel | | | | | Test results | |
| No. | Material | Thickness (mm) | Tensile strength (S) kg/cm (N/cm) | Breaking elongation (E) (%) | Tearing strength (T) kg (N) | M value | Thickness (mm) | Tensile strength S kg/cm (N/cm) | Breaking elongation (E) (%) | Tearing strength (T) kg (N) | M value | Front panel | Rear panel | Evaluation |
| 20 | | | | | | | 0.4 | 24.8 (243) | 375 | 5.10 (50.0) | 33.7 (3240) | oo | oo | Good |

Material:
A: Tafretan (ether system) NIPPON VALQUA INDUSTRIES, LTD.
B: Tafretan (lactone system) NIPPON VALQUA INDUSTRIES, LTD.
C: Silkron (ester system) OKURA INDUSTRIAL CO., LTD.
D: Pandex (adipate system) DAINIPPON INK & CHEMICALS, INC.
E: Tafretan (polycarbonate system) NIPPON VALQUA INDUSTRIES, LTD.

As described in detail above, the resin air bag of this invention provides a thermoplastic elastomer air bag having excellent burst resistance and durability. Accordingly, a resin air bag of this invention provides a thin membrane of thermoplastic elastomer bag by which a reduction in the size and cost of products can be achieved.

This invention provides an air bag for a driver which can be easily manufactured.

This invention provides an air bag for a driver which has a thinner and lighter membrane than that of a prior art and has an excellent burst resistance, and positively prevents the bursting of the bag.

This invention provides an air bag for a driver, which has a high heat resistance to the high temperature gas injected from the inflator.

This invention provides an air bag for a driver, which has an excellent burst resistance and heat resistance which has been achieved by an adequate combination of suitable materials.

I claim:

1. A resin air bag comprising,
   a thermoplastic elastomer film having a front panel and a rear panel which are fixed together at peripheries thereof, said front panel being located near a user when the air bag is inflated and said rear panel having an opening, said elastomer film having an M value between 4 and 50, the M value of the rear panel being at least equal to the M value of the front panel, said M value being defined by a formula given below:

$$M=(S/E) \times T \times 100$$

wherein S is a tearing strength (kg/cm) per unit width (1 cm) of the thermoplastic elastomer film, E is an elongation at rupture (%), and T is a tensile strength (kg), and a first layer attached to the rear panel around the opening at a side of the front panel, said first layer having a heat resistance higher than that of the thermoplastic elastomer film.

2. A resin air bag as set forth in claim 1, wherein the M value of the rear panel is greater than that of the front panel by 1.5 to 4.0 times, and the thickness of the thermoplastic elastomer film is between 0.2 and 0.4 mm.

3. A resin air bag as set forth in claim 2, wherein said front and rear panels are circular to form the air bar for a driver, the peripheries of the front and rear panels being fused together for attachment.

4. A resin air bag as set forth in claim 1, wherein the first layer is one of a coating layer and a heat resistive film.

5. A resin air bag as set forth in claim 4, wherein the thermoplastic elastomer is thermoplastic polyurethane and wherein the coating layer is a silicone resin.

6. A resin air bag as set forth in claim 4, wherein the thermoplastic elastomer is thermoplastic polyurethane and wherein the heat-resistant film is a polyimide resin.

7. A resin air bag as set forth in claim 4, further comprising a second layer attached to the rear panel at a side opposite to the first layer relative to the rear panel, said second layer being made of a same material as that of the first layer.

8. A resin air bag as set forth in claim 4, wherein the M value of the front panel is in a range from 5 to 20 and wherein the M value of the rear panel is in a range from 11 to 40.

* * * * *